United States Patent Office 3,606,920
Patented Sept. 21, 1971

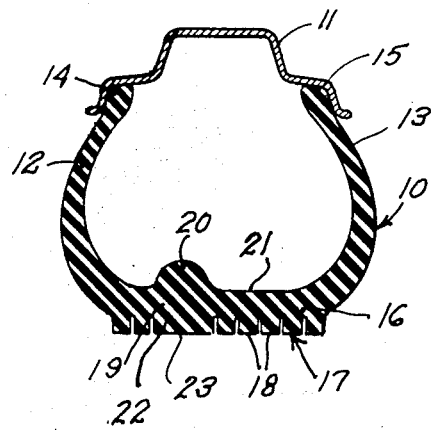
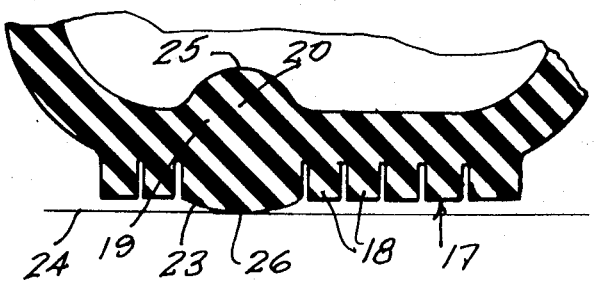
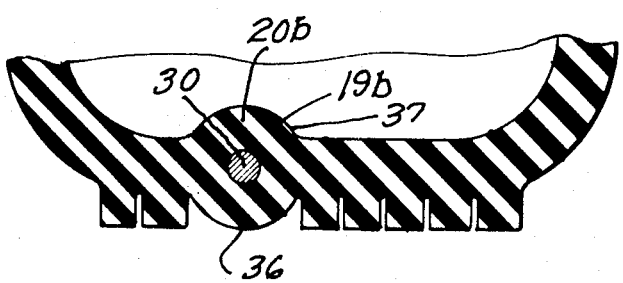
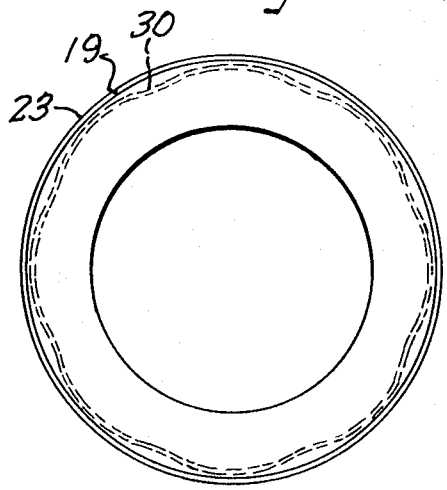
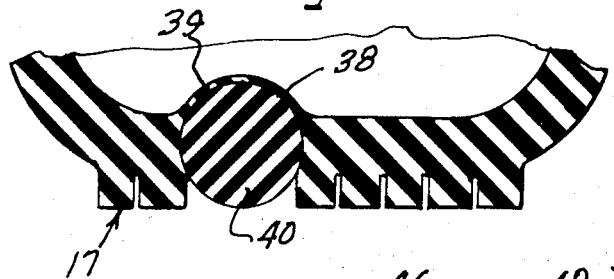
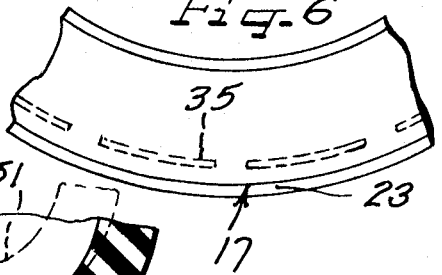

3,606,920
SPEED SENSITIVE DUAL TREAD TIRE
George J. Kole, 4049 N. Kolmar Ave.,
Chicago, Ill. 60641
Filed Apr. 1, 1969, Ser. No. 811,715
Int. Cl. B60c *19/00*
U.S. Cl. 152—352             9 Claims

ABSTRACT OF THE DISCLOSURE

A treaded tire of the pneumatic type which has a localized circumferential increased weight area adapted to increases the diameter of a localized portion of the tire tread due to centrifugal force at high speeds. The increased diameter portion of the tread reduces the contact area between the tire and the road at high speeds, thereby reducing the drag while at the same time reducing heat and friction and preventing hydroplaning of the tire. The increased diameter portion may be constructed of a longer-wearing material than the remainder of the tread. The invention does not interfere with full tread contact at slow speeds or while braking the vehicle.

BACKGROUND OF THE INVENTION

Field of the invention

This invention relates to pneumatic tires and more importantly to a speed-compensating tire tread.

Prior art

Automotive tires are generally constructed with a substantially U-shaped cross section having an exterior diameter tread configuration at the bight. For best braking and road-gripping characteristics, the tread is designed to run flat on the road with its entire width in contact with the road surface.

Recent developments in tire design have emphasized this characteristic further and have led to the development of wide-tread tires.

While such wide treads are greatly advantageous in braking, they lead to disadvantages at high speeds. At full highway speed, the frictional heat created by the tread contact with the road surface, which is purposely kept rough in many instances in order to aid in braking, can build up, adding to the operating heat of the tire, causing rubber degradation and leading to quick wear-out and possible failure of the tire body. In addition, the frictional contact between the wide tread and the surface creates a power loss which aids in increasing consumption of fuel at high speeds.

An additional disadvantage is created by the hydroplane effect of the tire on wet surfaces. Wide-tread designs create a large frontal area adjacent the point where the tire touches the surface. With a layer of wetness on the surface of the road, this frontal area can cause a hydroplane effect at high speeds which can, in extreme cases, eliminate tread contact with the running surface entirely. In such a situation attempted braking will not reduce the speed of the vehicle inasmuch as the hydroplane effect is present whether the tire is rotating or not.

SUMMARY

These disadvantages of wide-tread tires are overcome by the present invention which creates a narrow running surface at high speeds while retaining the wide-tread advantages at low speeds and during braking.

The invention utilizes the centrifugal force created by the rotation of the tire at high speeds. A localized circumferential portion of the tire tread and tire body is provided which is heavier than the remainder of the tread. This portion, while having an outer diameter equal to the outer diameter of the remainder of the tread at slow speeds, will, under the centrifugal force created by the rotating tire, project outwardly at high speeds. The outward projection of the localized circumferential portion of the tread allows the tire to ride on that portion alone, thereby reducing contact between the tire and the road surface from the entire tread width to the localized portion.

The localized portion is dimensioned and weighted so as to move radially outwardly only under high-speed conditions, thereby assuring that the full tread width will be in contact with the road during braking and low-speed operation of the vehicle. Inasmuch as braking at high speed will not only slow the r.p.m. of the wheel but will increase the force acting on the wheel, the entirety of the tread width will contact the road during braking.

In one embodiment, the localized portion consists of a relatively wide circumferential tread member having an increased radial thickness through the tire body. In another embodiment, a circumferential metal cord can be embedded in the rubber at the localized portion thereby increasing the weight of that portion. Preferably the cord is embedded in a relaxed state so as to allow circumferential expansion thereof.

In yet another embodiment, the portion consists of a circumferential insert set into the tire tread and body. Yet another embodiment envisions the use of segmented weights.

The localized portion may consist of a central area, a side area, or an off-center area. Off-center placement of the localized portion compensates for the towed-in alignment of most automotive wheels.

Because the localized portion is designed to be used primarily during high-speed operation, it may be constructed of a harder, longer-wearing material than the remainder of the tread which must be designed with other features in mind such as gripping ability.

It is therefore an object of this invention to provide a dual tread tire.

It is another object of this invention to provide a tire having a localized portion adapted to reduce the running area of the tire at high speed.

It is another and more important object of this invention to provide a dual tread tire having a localized circumferential heavy tread section which is adapted to be flung outwardly during high-speed rotation of the tire to provide a reduced area running surface.

Other objects, features and advantages of the present invention will be readily apparent from the following detailed description of certain preferred embodiments thereof taken in conjunction with the accompanying drawings.

BRIEF DESCRIPTION OF THE DRAWINGS

FIG. 1 is a cross-sectional view of a wheel-mounted tire body incorporating the principles of this invention.

FIG. 2 is a fragmentary cross-sectional view of a tire constructed according to the principles of this invention illustrated at high-speed running condition.

FIG. 3 is a fragmentary cross-sectional view of a tire constructed according to an alternate embodiment of this invention.

FIG. 4 is a plan view of a tire illustrating by dotted lines an embedded weight-increasing cord.

FIG. 5 is a view similar to FIG. 3 illustrating another embodiment of this invention.

FIG. 6 is a fragmentary plan view of a tire illustrating, by broken lines, an embedded segmented weight embodiment of this invention.

FIG. 7 is a view similar to FIG. 3 illustrating yet another embodiment of this invention.

DESCRIPTION OF THE PREFERRED EMBODIMENTS

The various figures illustrate suggested and preferred embodiments for practising this invention, however it is to be understood that other embodiments may be utilized. It is further to be understood that the dimensions illustrated in the drawings are not necessarily accurate and have been exaggerated in some instances to illustrate more clearly the invention.

FIG. 1 is a cross-sectional view of a tire 10 mounted on a wheel 11. The tire is substantially U-shaped in cross-section and has side walls 12 and 13 terminating at their upper end in fastening beads 14 and 15 which aid in attaching the tire to the wheel 11. The bight section 16 of the U-shaped cross section has on its outer diameter a tread formation 17 which, except for the teachings of this invention, may be standard in design. The tread is designed to contact the road surface across substantially its entire width in the usual manner and includes a plurality of axially spaced gripping elements 18.

As illustrated in FIG. 1, a preferred embodiment of the invention consists of a localized portion of the tire tread and tire body which is constructed according to the principles of this invention. The localized portion 19 consists of a circumferential portion of increased weight. The portion 19 is illustrated as consisting of an increased thickness 20 of the tire body which has an inner diameter less than the inner diameter 21 of the remainder of the bight section of the tire. The outer diameter portion 22 of the increased thickness portion 20 comprises a running surface 23 having a normal outer diameter equal to the normal outer diameter of the portions 18 of the remaining tread of the tire. The portion 22 is illustrated as being wider than the portions 18 athough it is to be understood that with other tread designs this may differ. The portion 19 may be constructed of the same material as the remainder of the tire body and tread and may include therein radial or circumferential cords and may be built up of numerous plies as is the standard practice in tire manufacture. Due to the increased radial thickness of the portion 20, it has a greater weight than the remainder of the tire body. During rotation of the tire, the centrifugal force created will act to move the entirety of the tread radially outwardly from the wheel 11. Inasmuch as centrifugal force is a function of mass, the increased weight portion will be acted upon to a greater extent than the remainder of the tire body.

FIG. 2 illustrates the effect of high-speed rotation upon the portion 19. As tire speed increases, the running surface 23 of the portion 19 will be thrown outwardly to a greater extent than the remainder of the tread 17. This will allow the remainder of the tread 17 to lift off of the road 24 on which the tire is operating. Contact between the road 24 and the tire will then be at the running surface 23 of the portion 19.

Lifting of the remainder of the tread off of the road will reduce the contact area between the tire and the road, thereby reducing friction and lessening the heat created by operation of the tire. In addition, because the frontal area of the portion of the tire contacting the road surface has been reduced, the hydroplaning effect above mentioned will be substantially reduced or eliminated.

It is to be understood that the dimensioning of the portion 19 can be controlled so as to create the desired characteristics which will allow the tire to remain in full tread contact with the road surface at all times except during high-speed operation.

The portion 19 is illustrated as being located off-center with respect to the width of the tire tread. This is provided so as to utilize the normal tow-in of an automotive wheel. As the speed of the vehicle increases, the tow-in of the wheel tends to straighten out. As the tire tends to straighten from its towed-in position, the portion 19, because of its off-center positioning, comes into play faster than it would if positioned centrally in the tread. The center of the portion 19 is preferably spaced approximately one-third of the width of the tread in from an axial end thereof, preferably the outside end.

In the embodiment illustrated in FIGS. 1 and 2, because the inner diameter portion 20 of the tire body radially in from the running surface 23 is axially curved creating the greatest mass at the midpoint 25 thereof, the running surface 23 of the portion 19 will also be curved at high speed, creating road contact at the central portion 26 thereof. The area of contact may be controlled by controlling both the curvature of the running surface 23 and the curvature of the portion 20.

FIG. 3 illustrates another embodiment of the circumferential localized portion 19b which functions the same as the portion 19 of FIGS. 1 and 2. In this embodiment, a circumferential cord 30 is embedded in the tire body centrally of the portion 19b. The cord 30 may be of any material but is preferably of a material which has a greater mass than the tire body. In this manner, the cord increases the mass of the portion 19b thereby increasing the centrifugal force acting against that portion. Therefore, the size of the inner portion 20b may be reduced while still achieving the same effect. The cord 30 is preferably embedded in the portion 19b in a relaxed state so that it may circumferentially expand allowing the portion 19b to be thrown out at high-speed operation. FIG. 4 illustrates one method of embedding the cord 30 in a relaxed state. The cord, illustrated by broken lines, is embedded in the tire body in a continuous radial wave or corrugation. During high-speed operation, the cord 30 will tend to become a true circle. When the cord 30 has become a true circle, further circumferential expansion thereof will be stopped. Thus, the amount which the portion 19b can circumferentially expand is limited by the expandability of the cord 30. Thereafter, no matter what the speed of rotation of the tire is, the portion 19b will not be further thrown out.

FIG. 6 illustrates an alternative method of obtaining weight increase. In place of the cord 30 of FIG. 4, a series of circumferentially spaced apart weights 35 are utilized. The weights 35 are embedded in the tire body in the same manner as the cord 30 and, because of their segmented nature, do not inhibit the expandability of the portion 19 but act merely to provide a circumferential increase in mass. It is to be noted that although FIG. 3 illustrates the outer diameter tread portion 36 on the inner diameter body portion 37 of the circumferential portion 19b as being arcuately curved, this is a matter of design preference. Further, inasmuch as the cord 30 adds mass to the tire body in a localized circumferential area, if the cord 30 is of sufficient mass, a decreased radius on the inner diameter of the tire body may be eliminated.

FIG. 5 illustrates another embodiment wherein a circumferential groove 38 is provided in the tread sections 17 of the tire. The groove 38 may be relatively deep, leaving a thin wall 39 of the tire body at its inner diameter. A circumferential insert 40 is placed in the groove 38 and bottoms therein against the back wall 39. The insert 40 may have a diameter greater than the normal thickness of the tire body and tread, or may be constructed of a heavier material. Either choice gives the insert 40 a greater mass than corresponding adjacent portions of the tire tread and body. Thus, the insert 40 is acted upon by the centrifugal force created by rotation of the tire to the same extent as the portion 19 of FIG. 1. The insert 40 may be permanently adhered to the remainder of the tire body, or may be removable therefrom to compensate for increased wear due to prolonged high-speed driving. The insert 40 may be constructed of a material having better wear qualities than the remainder of the tire tread, thereby reducing tire wear at high speeds.

Preferably, the insert 40 is continuous around the circumference of the tire and endless and is dimensioned to have a normal outer diameter equal to the normal outer diameter of the inflated tire.

FIG. 7 illustrates another embodiment of this invention wherein one side, preferably the outer side of the tire tread has an increased thickness. The increased thickness portion 45 is formed integral with the side wall 12 of the tire and provides a ledge 46 extending approximately one-third of the width of the tire in an axial direction. The outer diameter of the portion 45 contains a tread area 47 which may be specifically designed for high-speed driving. The remaining area 48 of the bight of the tire is dimensioned normally and contains a normal tread area 17 backed by the normal tire body area 49. An increased depth groove 50 extending radially inwardly circumferentially around the tire, divides the portion 45 from the portion 48. The groove 50 may cooperate with the tread design of the tire. During high-speed operation, the portion 45, due to its increased mass, will provide the running surface at the tread area 47. The remaining portion 48 will back away from the running area as illustrated by the broken lines 51. In this manner, the road contact area of the tire is reduced during high-speed driving, while at the same time providing tread contact with the road on the outside of the tire where it is most needed during high-speed turns. The tread 47 associated with the increased-thickness area 45 may then be designed for optimum advantages in high-speed running and cornering while the remainder of the tread may be designed for braking and gripping advantages.

It can therefore be seen that my invention provides for an improved dual tread tire which has an increased mass circumferential tread portion adapted to respond to high-speed rotation of the tire to reduce the contact surface between the tire and the road, thereby reducing drag and friction and minimizing or eliminating hydroplaning of the tire. The portion may be provided by an increase in thickness of a localized circumferential area of the tire or may be provided by embedded mass increasing inserts or a separable insert received in a groove. The invention allows the tire to have portions thereof constructed of longer-lasting, harder-wearing material specifically adapted for high-speed driving and provides for differences in tread design between given areas of the tire.

Although the principles of my invention have been discussed with reference to specific theories and embodiments, it is to be understood that these are by way of illustration only and that others may wish to utilize my invention in different designs or applications.

I claim as my invention:

1. In a pneumatic tire having a circumferential area adapted to ride against a running surface, the improvement of: a localized circumferential portion of said area having a mass greater than the mass of the portions of the remainder of said area whereby the said localized portion will circumferentially expand under the influence of centrifugal force created by high-speed rotation of the tire to limit the contact area between the tire and road to the said localized portion at high speeds, the said localized portion positioned axially off center of the circumferential area, the said localized portion being formed integrally with the said area.

2. The improvement of claim 1 wherein the said localized portion consists of a circumferential band of the said area having a greater thickness in a radial direction than the remainder of said area.

3. The improvement of claim 1 wherein the said localized portion includes a circumferential cord embedded in the material of said tire, said cord having a mass greater than the material of said tire.

4. The improvement of claim 3 wherein the said cord is embedded in the said tire in a free state allowing circumferential expansion of the said cord and localized portion.

5. The improvement of claim 4 wherein the circumferential expansion of the said cord is limited, prohibiting circumferential expansion of the said localized portion beyond a given point.

6. A vehicular tire comprising: a substantially U-shaped cross section tire body, a circumferential tire tread on the exterior of the bight of the U, a localized circumferential portion of said tread adapted to radially expand beyond the remainder of said tread in response to high-speed rotation of said tire, said localized portion having a low-speed rotation outer diameter substantially equal to the outer diameter of the remainder of the tread, the said localized portion positioned axially off center of the remainder of the tire tread, and the said localized portion providing the primary running surface at high speeds.

7. The tire of claim 6 wherein the said localized portion has a mass-to-area ratio greater than the mass-to-area ratio of the remainder of the tread area.

8. The tire of claim 7 wherein the said localized portion includes a greater radial thickness of tire tread and body than the remainder of the bight.

9. The tire of claim 6 wherein the said localized portion includes a circumferential groove extending radially into said tread, and a circumferential insert substantially filling said groove and defining the said outer diameter of the said localized portion.

References Cited

UNITED STATES PATENTS

| | | | |
|---|---|---|---|
| 1,456,062 | 5/1923 | Killen | 152—352 |
| 3,467,160 | 9/1969 | Oguri | 152—352 |
| 3,526,263 | 9/1970 | Sever | 152—221 |

FOREIGN PATENTS

| | | | |
|---|---|---|---|
| 1,223,949 | 6/1960 | France | 152—352 |

MILTON BUCHLER, Primary Examiner

C. A. RUTLEDGE, Assistant Examiner